United States Patent
Cole et al.

(10) Patent No.: US 9,738,507 B2
(45) Date of Patent: *Aug. 22, 2017

(54) HIGH PRECISION LIQUID DISPENSER

(71) Applicant: A.C. Dispensing Equipment Inc., Lower Sackville (CA)

(72) Inventors: Derek Cole, Lower Sackville (CA); Paul Gregory Erman, Head of Chezzetcook (CA); Ian MacLean, Fall River (CA)

(73) Assignee: A.C. Dispensing Equipment, Inc., Lower Sackville, Nova Scotia (CA)

( * ) Notice: Subject to any disclaimer, the term of this patent is extended or adjusted under 35 U.S.C. 154(b) by 38 days.

This patent is subject to a terminal disclaimer.

(21) Appl. No.: 15/046,833

(22) Filed: Feb. 18, 2016

(65) Prior Publication Data

US 2016/0362290 A1 Dec. 15, 2016

Related U.S. Application Data

(63) Continuation of application No. 14/737,950, filed on Jun. 12, 2015, now Pat. No. 9,296,603.

(51) Int. Cl.
*B67D 7/14* (2010.01)
*B67D 7/30* (2010.01)
(Continued)

(52) U.S. Cl.
CPC ........... *B67D 7/302* (2013.01); *B67D 3/0041* (2013.01); *B67D 7/303* (2013.01); *B67D 7/36* (2013.01);
(Continued)

(58) Field of Classification Search
CPC .... B67D 3/0077; B67D 3/0041; B67D 3/041; B67D 3/0003; B67D 3/0083; B67D 7/302;
(Continued)

(56) References Cited

U.S. PATENT DOCUMENTS

| 8,534,497 B2 | 9/2013 | Veltrop et al. ..................... 222/1 |
| 9,174,834 B2 | 11/2015 | Veltrop et al. .................. 222/55 |

(Continued)

FOREIGN PATENT DOCUMENTS

| AU | 728683 | 4/1999 | |
| CA | 2738192 | 4/2011 | |
| CN | 101446833 A | 6/2009 | ............... G05D 7/06 |

OTHER PUBLICATIONS

International Searching Authority, International Search Report and Written Opinion of PCT/CA2016/050205 dated May 10, 2016 (7 pages).

*Primary Examiner* — Frederick C Nicolas
(74) *Attorney, Agent, or Firm* — Sunstein Kann Murphy & Timbers LLP (57) ABSTRACT

In one embodiment, a liquid dispenser includes a liquid reservoir, a measurement device providing at least one signal indicative of the amount of liquid remaining in the liquid reservoir, an electrically actuated valve coupled to a tube outlet exiting from a bottom of the liquid reservoir, and a processor. The processor is electrically connected to the measurement device and operatively coupled to and controlling operation of the valve. Further, the processor is configured to determine a valve open time for dispensing a requested amount of liquid. The valve open time depends upon a preliminary time based on the requested amount and at least one signal from the measurement device, and an adjustment to the preliminary time based on a difference between a requested amount and a measured amount determined by the measurement device for at least one previous dispense.

21 Claims, 9 Drawing Sheets

(51) Int. Cl.
  *B67D 7/36* (2010.01)
  *G01G 17/06* (2006.01)
  *G01F 22/00* (2006.01)
  *G01F 13/00* (2006.01)
  *G01F 23/20* (2006.01)
  *G01G 13/24* (2006.01)
  *B67D 3/04* (2006.01)
  *B67D 3/00* (2006.01)

(52) U.S. Cl.
  CPC ............ *G01F 13/005* (2013.01); *G01F 22/00* (2013.01); *G01F 23/20* (2013.01); *G01G 17/06* (2013.01); *B67D 3/0003* (2013.01); *B67D 3/0019* (2013.01); *B67D 3/0077* (2013.01); *B67D 3/0083* (2013.01); *B67D 3/041* (2013.01); *G01G 13/24* (2013.01)

(58) Field of Classification Search
  CPC ........ B67D 7/36; B67D 3/0019; B67D 7/303; G01F 22/00; G01F 13/005; G01F 23/20; G01G 17/06; G01G 13/24
  See application file for complete search history.

(56) References Cited

U.S. PATENT DOCUMENTS

| | | | |
|---|---|---|---|
| 9,296,603 B1 * | 3/2016 | Cole | .................. B67D 7/36 |
| 2013/0292408 A1 | 11/2013 | Veltrop et al. | |

* cited by examiner

FIG. 9

HIGH PRECISION LIQUID DISPENSER

RELATED APPLICATION

This application claims priority to U.S. application Ser. No. 14/737,950, entitled "High Precision Liquid Dispenser" and filed Jun. 12, 2015, which is hereby incorporated by reference in its entirety.

TECHNICAL FIELD

The present solution relates to liquid dispensers, and more particularly, to liquid dispensers that adjust valve open times to dispense a predetermined amount of liquid.

BACKGROUND ART

In the prior art, liquid dispensers have been designed to respond to a user request for an amount of liquid by dispensing the requested amount. Such dispensers may achieve processor controlled dispensing by providing the processor with a signal indicating the amount of liquid remaining in the reservoir. The greater the amount of remaining liquid, the faster the liquid will dispense out of a reservoir outlet.

For example, Australian Patent No. 728683 to Pascoe ("Pascoe") describes a dispenser with a liquid reservoir that is supported by a load cell. The load cell is strained in response to the remaining liquid in the reservoir and continuously sends signals regarding the detected weight to a processor. Upon receiving the request for an amount of liquid, the processor controls the opening and closing of the valve. In this manner, each time the dispenser is asked to dispense a requested amount of liquid, the dispenser may obtain the output of the load cell and control the valve, leaving the valve open for a period suitable to dispense the requested amount.

Prior art dispensers may use formulas to determine the open valve time, and manufacturers may determine the formulas based on dispense data collected during testing or calibrating of their equipment. Methods for controlling the dispensing of liquid are described in Chinese Patent Publication No. 101446833 to Wang ("Wang"). Wang describes such calibration by filling the reservoir of a dispenser with a predetermined amount of liquid, positioning a container on a scale and under the dispenser's valve, and opening the valve to drain the liquid from the reservoir, while measuring the times and weights of the liquid dispensed. In this manner, Wang obtains data about the flow rate based on the amount of remaining liquid and fits the data to match a mathematical formula. From this formula, Wang derives another formula for the open valve time to dispense a requested amount of liquid, based on the amount of remaining liquid. Another example of a liquid dispenser may be found in U.S. Pat. No. 8,534,497 to Veltrop ("Veltrop").

In this manner, liquid dispensers in the prior art may be equipped with load cells that measure the remaining amount of liquid in the dispenser's reservoir. When a dispenser receives a user request for a requested amount of liquid, the dispenser may obtain the output of the load cell supporting the liquid reservoir and determine an open valve time to dispense that amount.

SUMMARY OF THE EMBODIMENTS

In accordance with one embodiment of the invention, a liquid dispenser includes a liquid reservoir, a load cell supporting at least a partial weight of the liquid reservoir, an electrically actuated valve coupled to a tube outlet exiting from a bottom of the liquid reservoir, and a processor. The processor is electrically connected to the load cell and operatively coupled to and controlling operation of the valve. Further, the processor is configured to determine a valve open time for dispensing a requested amount of liquid. The valve open time depends upon a preliminary time based on the requested amount and an output from the load cell, and an adjustment to the preliminary time based on a difference between a requested amount and a measured amount determined by the load cell for at least one previous dispense.

The processor may determine the preliminary time by evaluating a polynomial expression, the polynomial expression including coefficients that operate on the requested amount of liquid and the output from the load cell. The processor may determine the adjustment using at least an expected error factor. The processor may determine the expected error factor by adding, from at least two previous dispenses, differences between requested amounts and measured amounts.

The processor may determine the expected error factor by evaluating an expected error factor function, based on the requested amount. The processor may further determine an offset by comparing the expected error factor against the difference between the requested amount and the measured amount for the dispense. The processor may adjust the expected error factor function by the offset. The processor may further determine an offset by comparing the expected error factor against a weighted average of differences between the requested amount and the measured amount, for at least two previous dispenses. The processor may adjust the expected error factor function by the offset. In various embodiments, the processor adjusts the expected error factor function by adding or subtracting the offset.

In some embodiments, the processor determines the expected error factor by evaluating a plurality of expected error factor functions using the requested amount and the output from the load cell. The processor may identify two expected error factor functions whose evaluated results are closest to the difference between the requested amount and the measured amount for the dispense; and average the two expected error factors. The processor may store indicia of the two identified expected error factor functions. Moreover, the processor may determine the expected error factor for a subsequent dispense by retrieving the indicia of the two identified expected error factor functions, evaluating the two identified expected error factor functions using a requested amount of the subsequent dispense and an output from the load cell, and averaging the two expected error factors.

In some embodiments, the processor determines the expected error factor by calculating a weighted average of differences between requested amounts and measured amounts, from at least two previous dispenses. The preliminary time may be based on an entry in a look-up table, the entry being indexed according to the requested amount of liquid and the output from the load cell. The liquid dispenser may include a memory buffer that stores, for at least one dispense, a difference between a requested amount and a measured amount. The processor may be configured to receive a first output from the load cell, open the valve for the valve open time, receive a second output from the load cell, determine a measured amount based on the first and second outputs from the load cell, determine a difference between the requested amount and the measured amount, and store the difference in a memory buffer.

In some embodiments, the dispenser includes a user interface configured to receive a value of the requested amount of liquid from a user. The load cell may support a full weight of the liquid reservoir. The chamber may be configured to receive a rigid tank or a bag that houses the liquid. The tube may be flexible, and the valve may be a pinch valve.

In accordance with another embodiment of the invention, a liquid dispenser includes a liquid reservoir, a load cell supporting at least a partial weight of the liquid reservoir, and an electrically actuated valve coupled to a tube outlet that is positioned near a bottom of the liquid reservoir. The dispenser also includes a memory configured to store data regarding requested amounts of liquid, remaining amounts of liquid in the reservoir, and valve open times for dispensing the requested amounts of liquid in light of the remaining amounts of liquid in the reservoir. The processor is electrically connected to the load cell and operatively coupled to and controlling operation of the valve. The processor determines a valve open time by evaluating a polynomial expression, which includes coefficients that operate on a user-requested amount of liquid to be dispensed and the output from the load cell. The processor determines a measured amount of liquid dispensed based on outputs of the load cell before the dispense and after the dispense. The processor replaces data in the memory with the valve open time, output from the load cell, and measured amount of liquid dispensed, and re-determines the coefficients for the polynomial expression.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Although liquid dispensers are commonly configured under ideal testing conditions, once the dispensers are installed in commercial settings, extrinsic factors introduce errors into their determinations of valve open times for dispensing amounts of liquid. For example, although a dispenser may have been calibrated in a laboratory setting held at a constant temperature, in some circumstances, a user may fill a dispenser's chamber with a liquid that is above room temperature. Thus, the liquid may initially flow faster than the liquid used during calibration. Moreover, its flow rate may decrease as the liquid cools to room temperature or the temperature of the refrigerated chamber. As a result, although the liquid dispenser may initially calculate valve open times that dispense excess liquid, the times may eventually become more accurate. In another example, when a liquid reservoir (e.g., tank, bag) includes a flexible tube for dispensing the liquid, a user may accidentally bend the tube before or while installing the reservoir in the dispenser's chamber, and the deformation may obstruct the flow of liquid through the tube. Because the liquid dispenser's calculations assume that liquid is flowing in an unobstructed manner, the liquid dispenser will calculate inaccurate valve open times consistently.

The present solution compensates for potential errors in valve open times based on differences between the amounts the liquid dispenser dispensed (e.g., differences in the weights of remaining liquid in the dispenser before and after dispenses, also referred to herein as "measured amounts") and the amounts of liquid expected for dispenses (e.g., the amounts requested by users, also referred to herein as "requested amounts").

To achieve its objective, the liquid dispenser may determine a preliminary valve open time based on a requested amount of liquid and the amount of liquid remaining in the dispenser. Then, based on the difference between the requested and measured amounts for at least one prior dispense, the liquid dispenser may determine an adjustment to the preliminary valve open time. Because the liquid dispenser accounts only for more recent dispenses, the dispenser may stop compensating for temporary extrinsic factors (e.g., above average initial temperatures) after they no longer impact the flow rate. Since permanent factors will constantly be reflected in the dispenser's operations, the dispenser will continue to account for their influence on the valve open time. In this manner, the liquid dispenser may adjust its valve open times to account for extrinsic factors that cannot be anticipated from laboratory conditions. As a result, dispenses of liquid may more accurately correspond to the requested amounts of liquid.

Figure 1:
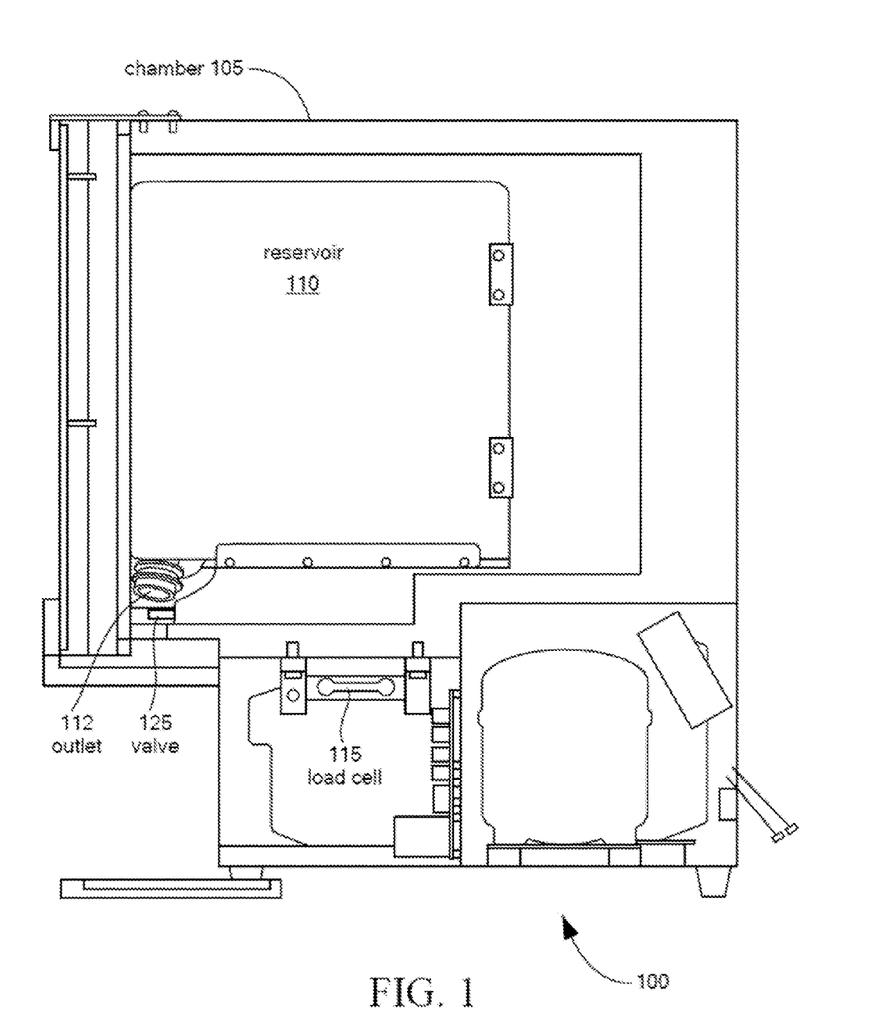
FIG. 1 depicts a cross-section of an exemplary liquid dispenser.

FIG. 1 depicts a cross-section of an exemplary liquid dispenser 100 according to the present solution. The dispenser 100 includes a chamber 105 that houses the reservoir 110 that will contain the liquid to be dispensed, and the reservoir 110 includes an outlet 112 through which the liquid will flow. The chamber 105 also includes a load cell 115 that supports the weight of the reservoir 110. Moreover, the chamber 105 includes a valve 125, whose operation will permit or prevent liquid from flowing through the outlet 112.

Figure 2:
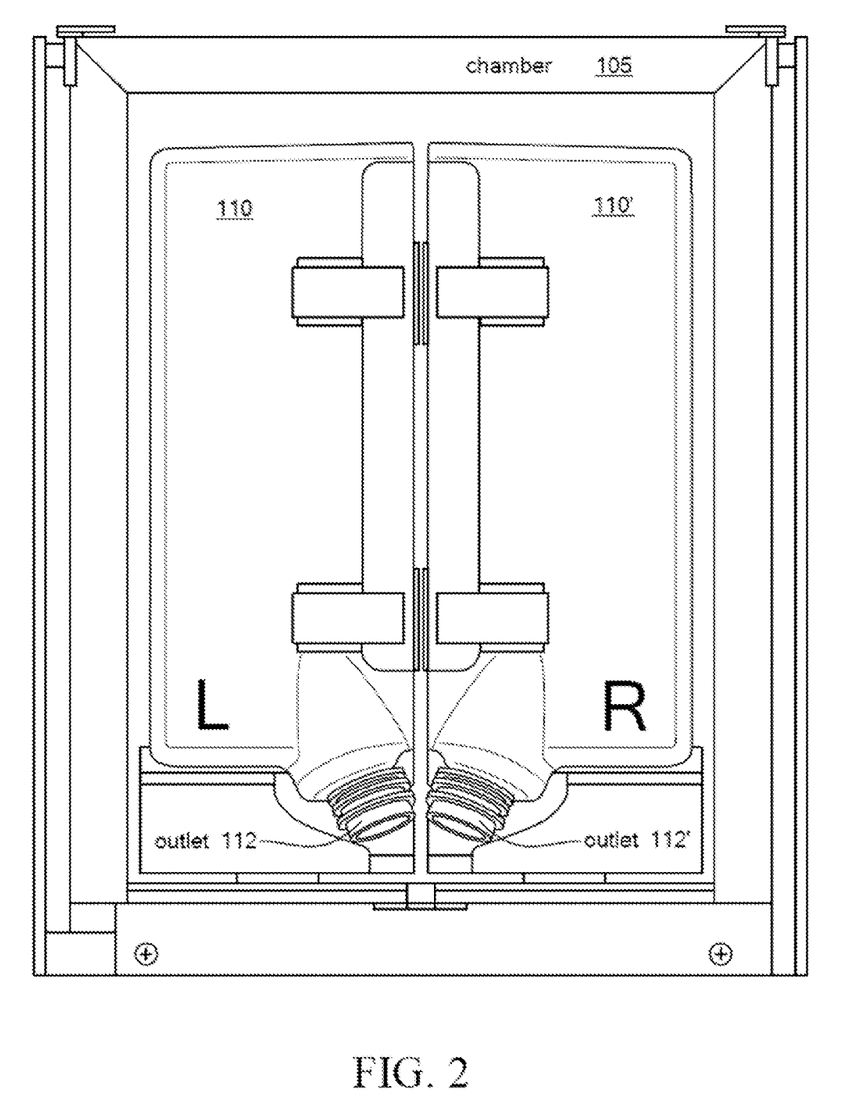
FIG. 2 depicts an exterior view of an exemplary liquid dispenser configured to dispense two liquids.

FIG. 2 depicts an exterior view of another exemplary liquid dispenser 100. This dispenser 100 is configured to dispense two liquids. Thus, the dispenser 100 has one chamber 105 with two reservoirs 110 and 110', as well as two outlets 112 and 112'. Furthermore, the dispenser includes two of each element shown in FIG. 1. In this manner, a user may fill one reservoir 110 with milk and the other reservoir 110' with half-and-half, by way of example, and operate the dispenser 100 to dispense one liquid or the other. Although not shown in these figures, the dispenser 100 may include a user interface with controls (e.g., push buttons), each control corresponding to a different amount of liquid to be dispensed. For example, each button may be labeled with a size, such as "small", "medium", and "large", and each size may be associated with a different amount of liquid (e.g., 10 mL, 15 mL, 20 mL).

Figure 3:
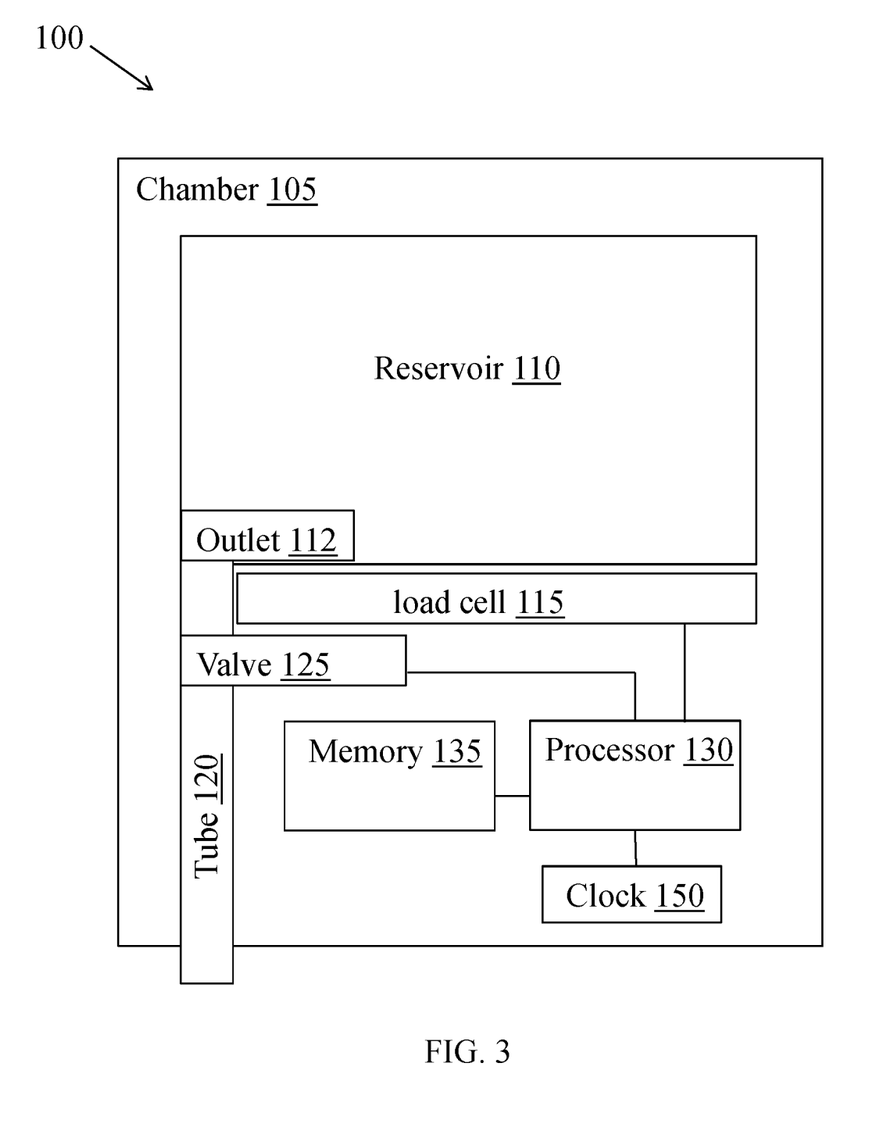
FIG. 3 depicts a schematic diagram of an exemplary liquid dispenser, according to the present solution.

FIG. 3 depicts a schematic block diagram of an exemplary liquid dispenser 100 according to the present solution. The liquid dispenser 100 includes the chamber 105 and reservoir 110 with outlet 112, as depicted in FIGS. 1 and 2. The outlet 112 can accommodate a tube 120, and the tube 120 may be fitted through the valve 125. Further, the liquid reservoir 110 rests upon a load cell 115, which determines an amount indicative of the weight of liquid in the reservoir 110. The load cell 115 and valve 125 are electrically connected to a processor 130, and the load cell 115 may continuously send signals regarding the weight of the liquid in the reservoir 110 to the processor.

The processor 130 may be electrically connected to the user interface positioned on the exterior of the chamber 105. By selecting a control from the user interface, the user may request that a particular amount of liquid be dispensed, and the processor 130 determines a valve open time for the dispense. For example, the processor 130 may determine a preliminary time from the requested amount, based on the user-selected control, and the amount of liquid remaining in the reservoir 110, based on the output of the load cell 115. Then, the processor 130 may further adjust this preliminary time based on prior errors of the dispenser 100, stored in memory 135.

The processor 130 sends a signal to open the valve 125, thereby allowing liquid to flow from the reservoir 110 through the tube 120. The processor 130 tracks time based on clock 150, and the processor 130 further uses the clock to determine when the valve open time has elapsed. Then, the processor 130 halts its signal to the valve 125, and the valve 125 closes to prevent liquid from flowing through the tube 120. The valve 125 remains closed until it receives another signal from the processor 130 to open.

The processor 130 measures the amount of liquid dispensed by, for example, subtracting the weight of liquid remaining in the reservoir 110 after the dispense from the weight of liquid in the reservoir 110 prior to the dispense. The processor 130 further determines a difference between the user-requested amount and the measured amount of the dispense, and stores this difference in memory 135. As the liquid dispenser 100 receives more dispense instructions from the user interface, the dispenser 100 determines and stores additional such differences, which are used to adjust valve open times in subsequent dispenses.

Metrics for User-Requested Amounts of Liquid, and Measured, Dispensed Amounts of Liquid Throughout the disclosure, the user-requested amounts of liquid may be described in terms of volume, such as 10 mL, 15 mL, 20 mL, etc. This metric is used for convenience because the contexts in which liquid dispensers are used contemplate liquid amounts by volume. For example, when a liquid dispenser is used in a coffee shop, a recipe for a particular drink may call for 15 mL of whole milk.

However, because the liquid dispenser 100 measures amounts of dispensed liquid based on outputs of the load cell 115, these measured amounts may be described in terms of weight. Nevertheless, the dispenser 100 may store the density of the liquid in the reservoir 110 and use this density to convert a volume of requested liquid into a corresponding weight of liquid, or vice versa.

For example, the dispenser 100 may convert the volume of a user-requested amount of liquid into a weight, and then compare the weight of the requested amount against the weight of the amount of liquid dispensed from the dispenser. Alternatively, the dispenser 100 may convert the weight of dispensed liquid into a volume, and compare this volume against the user-requested volume of liquid. In any situation, whenever amounts of liquid are discussed in this disclosure, the dispenser may use the liquid's density to ensure that all amounts are accounted for using the same metric, whether by weight or volume.

Storage of Differences Between User-Requested and Measured Amounts of Liquid

According to the present solution, each time the dispenser 100 dispenses liquid, the dispenser 100 determines and stores the difference between the user-requested amount of liquid, and the measured amount of liquid for the dispense. The dispenser 100 may organize and store these differences in various ways, for use according to different embodiments of the invention described herein.

For example, the dispenser 100 may organize the differences based on the user-requested amounts. In this manner, the dispenser 100 may store a set of differences for 10 mL dispenses, a set for 15 mL, and so on. Thus, when the user requests a particular amount of liquid, such as 10 mL, the dispenser 100 may rely solely on the accumulated data for 10 mL dispenses for determining the adjustment to the preliminary valve open time.

In another example, the dispenser 100 may organize the differences simply based on the order of their corresponding dispenses. In this manner, the user-requested amount for any given dispense is irrelevant. If the dispenser 100 stores differences for the past 10 dispenses, the data may include differences for four 10 mL dispenses, three 15 mL dispenses, and three 25 mL dispenses, or any other combination. In these embodiments, when the user requests a particular amount of liquid, such as 10 mL, the dispenser 100 may rely on the accumulated data for dispenses of different amounts for determining the adjustment to the preliminary valve open time.

In some embodiments, the dispenser 100 stores the differences as absolute amounts or percentages. For example, suppose a user requested that the dispenser 100 dispense 20 mL of whole milk, and the liquid dispenser 100 determines that only 18.6 mL were dispensed. The dispenser 100 may store the difference as 1.4 mL, or 7%.

Determining the Valve Open Time

In various embodiments, the dispenser 100 stores a polynomial expression for the valve open time in memory 135. Using the user-requested amount of liquid and the output from the load cell 115, the processor 130 may evaluate the polynomial expression to determine the preliminary valve open time and the adjustment, the sum of which produces the valve open time for the dispense. The valve open time may be represented by $$t(R, W, e) = f(R, W) - a(R, W, e) \quad (1)$$

in which f(R, W) corresponds to the preliminary valve open time and a(R, W, e) corresponds to the adjustment. These functions depend on the user-requested amount of liquid, R, and the amount of liquid remaining in the reservoir, W. The function for the adjustment also depends on e (also referred to herein as the "expected error factor"), which accounts for the dispenser's past dispenses. As the dispenser 100 compensates for errors introduced by extrinsic factors, the expected error factor converges upon a constant value. As the expected error factor approaches this constant, the error in the amount of liquid dispensed simultaneously diminishes to zero (0) or near zero. Methods of determining the expected error factor will be described in further detail below.

The preliminary valve open time may be determined by a polynomial expression expressed, by way of example, as $$f(R,W)=A+B\cdot W+C\cdot W\cdot R+D\cdot W^2+E\cdot W^2\cdot R+F\cdot W^3R+G\cdot R+H\cdot R^3 \quad (2)$$

in which A, B, C, D, E, F, G, and H are coefficients. In some embodiments, the manufacturer selects and stores approximate coefficients in memory, and in other embodiments, the coefficients are determined by fitting calibration data to a polynomial expression. For example, a manufacturer may fill the chamber 105 of a dispenser 100 with a liquid, open the valve 125, and measure the amount of liquid remaining in the chamber 105 as a function of time. In this manner, the manufacturer may collect data regarding the dispense rates of the dispenser 100. The manufacturer may fit the data to a polynomial expression, and use this expression to derive another one, including the coefficients A, B, C, D, E, F, G, and H contemplated above, for determining preliminary valve open times.

Alternatively, the manufacturer may store preliminary valve open times in a look-up table in memory 135. In this situation, the user-requested amount of liquid, R, and the amount of liquid remaining in the reservoir, W, may be used as indices into the table. In this manner, the processor 130 may retrieve a stored preliminary valve open time for the dispense.

The adjustment a(R, W, e) may be a polynomial expression derived from the expression for the preliminary valve open time. As the reservoir 110 empties, the flow rate slows, and the error experienced in the next dispense may be expected to be smaller than the error experienced in previous dispenses. In this manner, the expected error may be related to the rate at which the flow rate changes. In some embodiments, it may be desirable to account for the changing flow rate by partially differentiating f(R, W) with respect to the amount to be dispensed yields. This yields the reciprocal of the flow rate, $\partial f(R, (W-R))/\partial R$. This expression may correspond to the slope of the function f(R, W). Furthermore, the rate of change may be multiplied by the expected error factor to determine the adjustment to the preliminary time. Thus, in some embodiments, the adjustment may be expressed as $$a(R,W,e)=e\cdot\partial f(R,(W-R))/\partial R \quad (3)$$

Additionally, in some embodiments, when the polynomial expression in (2) is used for the preliminary valve open time, partially differentiating this expression with respect to the requested amount to be dispensed yields:

$$\partial f(\ )\partial R=C\cdot W+E\cdot W^2+F\cdot W^3+G+3H\cdot R^2 \quad (4)$$

By substituting this expression into (3), the adjustment may be expressed as $$a(R,W,e)=e\cdot(C\cdot W+E\cdot W^2+F\cdot W^3+G+3H\cdot R^2) \quad (5)$$

Additionally, because the adjustment changes the length of the valve open time, the adjustment impacts the end of the dispense. Thus, the formula for the adjustment (5) may be evaluated using the ending amount of liquid in the reservoir (e.g., the amount of liquid remaining after the requested amount has been dispensed), namely, (W−R) (although in some embodiments, the formula may be evaluated using the beginning amount of liquid, W, or any intermediate amount). Using the ending amount of liquid, the expression for the adjustment may be evaluated as $$a(R,W,e)=e\cdot(C\cdot(W-R)+E\cdot(W-R)^2+F\cdot(W-R)^3+G+3H\cdot(W-R)^2) \quad (6)$$

By substituting the polynomial expression for the preliminary valve open time of (2) and the adjustment of (6) into the expression for the valve open time expressed in (1), the valve open time becomes:

$$t(R,W,e)=t=A+B\cdot W+C\cdot W\cdot R+D\cdot W^2+E\cdot W^2\cdot R+F\cdot W^3\cdot R+G\cdot R+H\cdot R^3\cdot e\cdot(C\cdot(W-R)+E\cdot(W-R)^2+F\cdot(W-R)^3+G+3H\cdot(W-R)^2) \quad (7)$$

wherein t may be expressed in milliseconds and R and W may be expressed in milliliters (e.g., the dispenser 110 converts the weight of remaining liquid in the reservoir 110 to volume, based on the density of the liquid). In various embodiments, t may be expressed in seconds. In some embodiments, R and W may be expressed in grams, kilograms, or liters.

Figure 4:
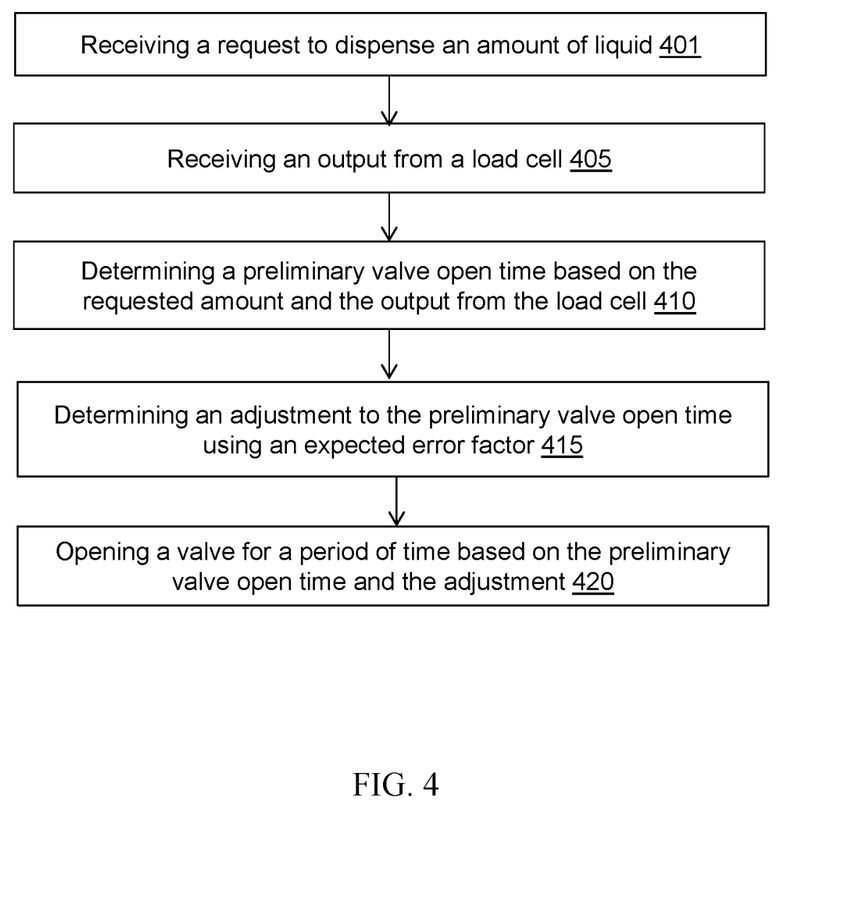
FIG. 4 depicts an exemplary flow diagram for a method of operating a liquid dispenser.

FIG. 4 depicts an exemplary flow diagram for a method of operating a liquid dispenser, using the preliminary valve open time and the adjustment. The method includes receiving a user-requested amount to be dispensed (step 401). For example, the liquid dispenser may receive a requested amount selected by a user from a user interface. The method also includes receiving an output from a load cell (step 405). The load cell may support a liquid reservoir, and may deflect based on the amount of liquid remaining in the reservoir. The method also includes determining a preliminary valve open time based on the requested amount and the output from the load cell (step 410). In some embodiments, the liquid dispenser determines this time by evaluating a polynomial expression using the requested amount and the output from the load cell. The method also includes determining an adjustment to the preliminary valve open time using an expected error factor (step 415). The expected error factor and the adjustment may be determined according to any of the steps described herein. Further, the liquid dispenser determines the valve open time by applying the adjustment to the preliminary valve open time. The method includes opening a valve for the valve open time (step 420). The processor may send the valve an open signal, and may also begin a timer based on a clock signal. The valve may open in response to the signal, thereby allowing liquid to flow from the reservoir, through a tube, and out of the dispenser 100. When the valve open time elapses, the processor may stop sending the signal. In response, the valve closes and prevents liquid from flowing through the tube.

Determining the Expected Error Factor: Method #1

One method of determining the expected error factor accumulates information about the differences between the user-requested amounts for dispenses and the measured amounts. As the valve open times for the dispenser 100 become more accurate, the differences between the user-requested and measured amounts for dispenses decrease and eventually approach zero. In this manner, the additions or subtractions to the expected error factor become negligible, and the expected error factor converges around a constant value.

The dispenser 100 may initialize the expected error factor to zero (0). After the first dispense, the dispenser 100 measures the amount of liquid released from the reservoir 110 and determines the difference between this amount and the user-requested amount, $diff_1$. The dispenser 100 multiples this difference, $diff_1$, by a weight, $\tau$, and sets the weighted difference to the expected error factor. The weight, $\tau$, is a fraction less than 1.0 so as to make a gradual response to a measured error.

$$e=\tau^*diff_1$$

The dispenser 100 stores this value as the expected error factor, e. When the dispenser 100 receives the next user request to dispense an amount of liquid, the dispenser 100 retrieves the stored expected error factor, e. The dispenser 100 determines the valve open time for this next dispense by applying the stored expected error factor, e, the user requested amount, and the amount of liquid remaining in the reservoir to the valve open time function t(R, W, e), in (7). After opening the valve 125 for this length of time, the dispenser 100 again determines the difference between the user-requested amount and the measured amount, $diff_2$, and applies the weight τ. The dispenser 100 adds the new weighted difference to the prior value of the expected error factor. Thus, the expected error factor becomes $$e = \tau * diff_1 + \tau * diff_2$$
$$= \tau * (diff_1 + diff_2)$$

The dispenser 100 stores this value as the updated expected error factor, and continues using and updating the expected error factor for subsequent dispenses. The dispenser 100 repeats these steps for dispenses such that the expected error factor may be expressed as $$e = \tau * \Sigma diff_N, \text{ where } N=1,2,3,\ldots$$

As the dispenser 100 increases the accuracy of its valve open times, the dispense differences approach zero. In this manner, the additions or subtractions to the expected error factor become negligible, and the expected error factor converges around a constant value.

Figure 5:
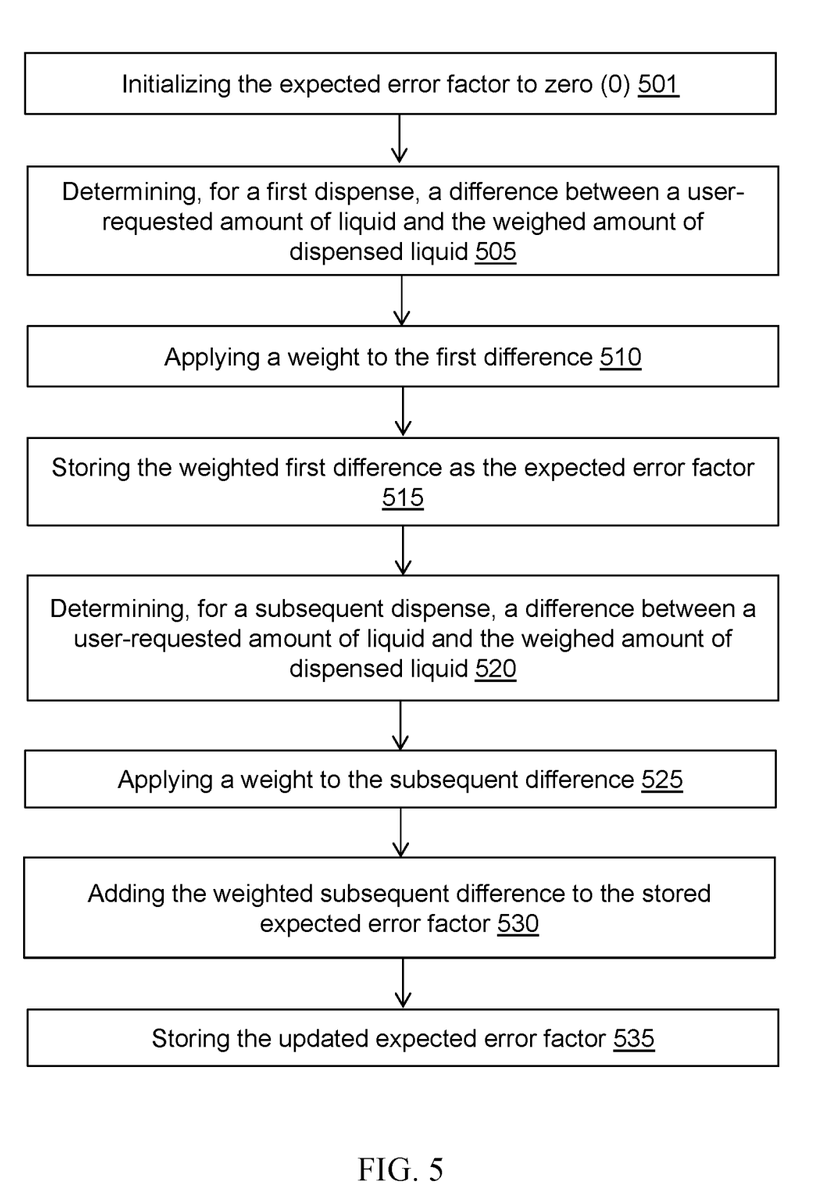
FIG. 5 depicts an exemplary flow diagram for a method of determining the expected error factor.

FIG. 5 depicts an exemplary flow diagram for this method of determining the expected error factor. In FIG. 5, the method includes initializing the expected error factor to zero (0) (step 501). The method also includes determining, for a first dispense, a difference between a user-requested amount of liquid and the measured amount of dispensed liquid (step 505). In response to a user selection of an amount of liquid to dispense, a dispenser may determine a preliminary valve open time. The dispenser may open the valve for the period of time and weigh the amount dispensed. The dispenser may determine the difference between the requested and measured amounts. The method also includes applying a weight to this difference (step 510) and storing the weighted difference as the expected error factor (step 515).

The method also includes determining, for a subsequent dispense, a difference between a user-requested amount of liquid and the measured amount of dispensed liquid (step 520). In this subsequent dispense, the dispenser receives the user-requested amount of liquid to be dispensed, and determines a preliminary valve open time accordingly. Using the expected error factor determined according to the prior dispense, the dispenser determines an adjustment to the preliminary valve open time, and updates the open time accordingly. The dispenser opens the valve for the updated amount of time, measures the amount dispensed, and determines the difference between the requested and measured amounts. The method also includes applying a weight to the difference (step 525), adding the weighted difference to the stored expected error factor (step 530), and storing the updated expected error factor (step 535).

Determining the Expected Error Factor: Method #2

Another method of determining the expected error factor averages the differences between the user-requested and measured amounts for a predetermined number of prior dispenses, and weights this average against the corresponding difference for the most recent dispense. In one embodiment, the expected error factor may be represented by the function:

$$e = \phi * diff_{recent} + (1-\phi) * diff_{average}$$

where ϕ is a constant, representing the rate at which the liquid dispenser accounts for the most recently acquired difference. Moreover, $0 < \phi < 1$.

For example, the dispenser 100 may initialize the expected error factor to zero (0). For the first dispense, the dispenser 100 may determine the difference between the user-requested and measured amount, $diff_1$, and multiply it by a weight ϕ. Thus, after the first dispense, the expected error factor may be $$e = \phi * diff_1$$

When the dispenser 100 receives a user request for a second dispense, the dispenser 100 determines the difference between the user-requested and measured amounts, $diff_2$. Because there is only one prior dispense, the average value for differences between user-requested and measured amounts is exactly that difference for the first dispense. Thus, after the second dispense, the expected error factor may be $$e = \phi * diff_2 + (1-\phi) * diff_1$$

However, after the third dispense, the average for past dispenses accounts for the differences between the user-requested and measured amounts in the first and second dispenses. Thus, in this situation, $$diff_{average} = (diff_1 + diff_2)/2$$

Accordingly, the expected error factor may become $$e = \phi * diff_3 + (1-\phi) * (diff_1 + diff_2)/2$$

In some embodiments, the dispenser 100 limits the number of past dispenses accounted for. For example, the dispenser 100 may account for only the past five (5) dispenses such that the dispenser 100 discards information from older dispenses. Thus, for a given dispense N, the expected error factor may be $$e = \phi * diff_N + (1-\phi) * (diff_{(N-1)} + diff_{(N-2)} + diff_{(N-3)} + diff_{(N-4)} + diff_{(N-5)})/5$$

Thus, differences from dispenses (N−6) and earlier are no longer considered in determining the expected error factor.

Determining the Expected Error Factor: Method #3

Figure 6:
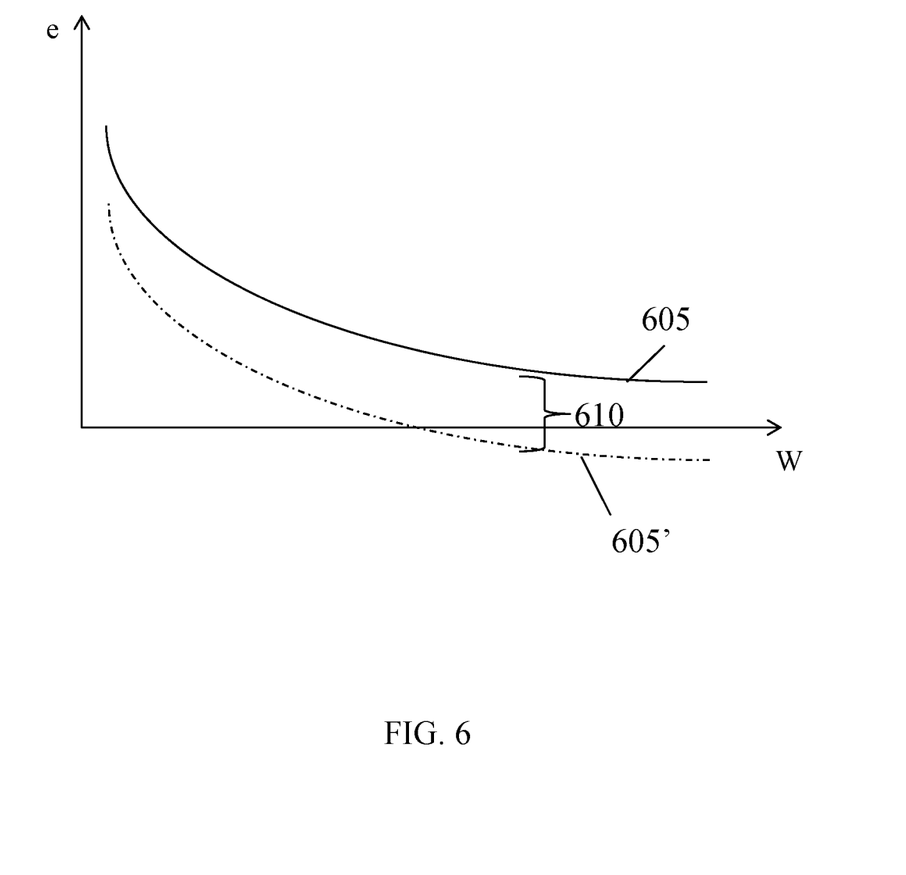
FIG. 6 depicts a graphical representation of an expected error factor function.

Another method of determining the expected error factor uses a function based on experimental data. For example, while testing a liquid dispenser under laboratory conditions, the manufacturer may identify optimal values for the expected error factor for different amounts of remaining liquid in the dispenser 100. The manufacturer may fit a curve to the expected error factor values and store a function corresponding to the curve in memory. By way of example, FIG. 6 depicts a graphical representation of such a curve 605, as a function of the remaining amount of liquid in a dispenser, W. Thus, when the liquid dispenser 100 receives a user request to dispense an amount of liquid, the liquid dispenser 100 determines the amount of liquid remaining in the reservoir 110, based on the output of the load cell 115, and determines the expected error factor from the function 605.

In some embodiments, the dispenser 100 may adjust the function 605 based on the differences between user-requested and measured amounts for recent dispenses. In particular, the processor 130 may determine a numerical value (referred to herein as an "offset") to add or subtract from the function 605. The impact of this offset 610 on the function 605 is depicted in FIG. 6—subtracting the offset 610 from the function 605 yields the modified function 605'. In some embodiments, the processor 130 may store the expected error factor function 605 separately from the offset 610 in memory 135, and update the offset 610 based on the most recent dispenses. In various embodiments, the processor 130 incorporates the offset 610 into the expected error factor function 605 after each dispense, and calculates a new offset 610 to add or subtract to the function 605.

After the dispenser 100 dispenses an amount of liquid, in response to a user request, the dispenser 100 may determine the offset 610 to adjust the expected error factor function 605. First, the dispenser 100 may evaluate the expected error factor function 605, based on the remaining amount of liquid in the reservoir 110, W. Then, the dispenser 100 may determine the difference between the user-requested and measured amounts for the dispense. The dispenser 100 may base the offset 610 on the evaluated result of the function 605 and the difference for the dispense, and add or subtract the offset 610 from the function 605 accordingly.

Alternatively, the dispenser 100 may base the offset 610 on the evaluated result of the function 605 and a weighted average of differences associated with multiple dispenses. In one embodiment, the dispenser 100 may use the most recent dispense and at least one dispense corresponding to the user-requested amount of liquid. For example, suppose the dispenser 100 stores the dispense differences in the following manner:

| Dispense # | Requested amount | Difference |
|---|---|---|
| 1 | 10 mL | 0.5 mL |
| 2 | 15 mL | 0.7 mL |
| 3 | 20 mL | 0.6 mL |
| 4 | 20 mL | 0.4 mL |
| 5 | 10 mL | 0.6 mL |
| 6 | 15 mL | 0.5 mL |
| 7 | 20 mL | 0.7 mL |
| 8 | 30 mL | 0.9 mL |
| 9 | 25 mL | 0.8 mL |
| 10 | 10 mL | 0.5 mL |

In one example, the user requests that the liquid dispenser 100 dispense 25 mL of liquid. Because the most recent dispense is #1, the dispenser 100 retrieves the difference of 0.5 mL for a dispense of 10 mL. The dispenser 100 also identifies dispense #9 as the most recent dispense of 25 mL, the requested amount requested by the user, and retrieves its difference of 0.8 mL. The processor 130 may take a weighted average of 0.5 mL and 0.8 mL to calculate the difference to compare against the evaluated value of the expected error factor function 605.

Figure 7:
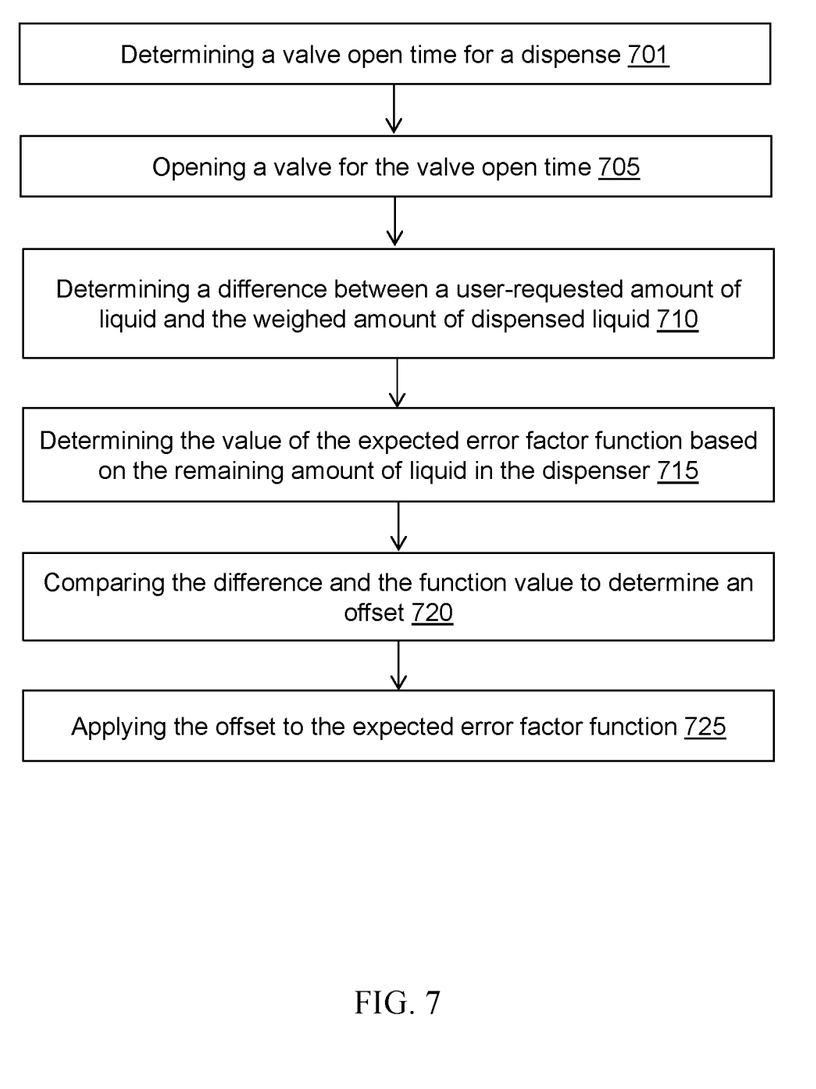
FIG. 7 depicts an exemplary flow diagram for a method of determining the expected error factor function of FIG. 6.

FIG. 7 depicts an exemplary flow diagram for this method of determining the expected error factor. In FIG. 7, the method includes determining a valve open time for a dispense (step 701). In response to a user selection of an amount of liquid to dispense, a dispenser may determine a preliminary valve open time. The method also includes opening a valve for the valve open time (step 705). The method includes determining a difference between a user-requested amount of liquid and the measured amount of dispensed liquid (step 710) and determining the value of the expected error factor function based on the remaining amount of liquid in the dispenser (step 715). In particular, the dispenser may evaluate the expected error factor function based on the output signal from the load cell. The method also includes comparing the difference and the function value to determine an offset (step 720). For example, the dispenser may subtract the function value from the difference. The method also includes applying the offset to the expected error factor function (step 725). The dispenser may add the offset to the expected error factor function, and the sign of the offset may depend on the respective magnitudes of the dispense difference and the function value.

Determining the Expected Error Factor: Method #4

Figure 8:
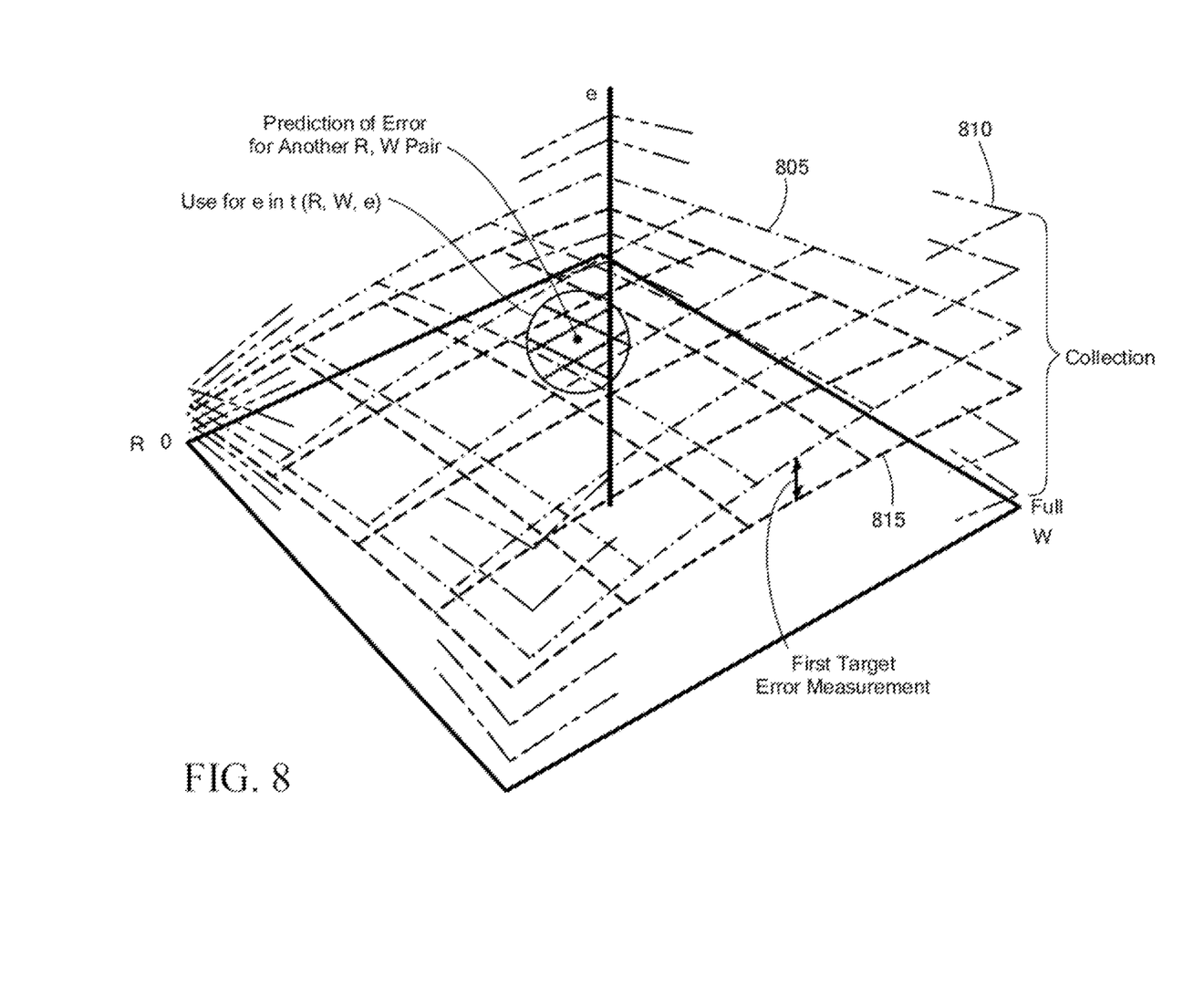
FIG. 8 depicts graphical representations of expected error factor functions.

Another method of determining the expected error factor uses multiple functions based on experimental data. Each function may be a 3D surface plot based on data collected during manufacturer testing, under conditions that introduce different extrinsic factors that impact the performance of the liquid dispenser 100. For example, one function may be applicable when a manufacturer loads milk into the reservoir 110, whereas another may be applicable when a manufacturer loads half-and-half. Another function may be applicable when a tube 120 has been bent. Exemplary functions 805, 810, 815, are depicted in FIG. 8.

The dispenser 100 determines which two functions mostly closely match its performance. In this manner, the dispenser 100 implicitly selects the functions associated with extrinsic factors that mostly closely match the dispenser's environment. Therefore, the dispenser 100 may evaluate these two functions and use the results to determine the expected error factor.

To obtain the different functions, the manufacturer may first test a dispenser 100 under ideal operating conditions, e.g., reservoirs with untampered tubes, liquids held at expected storage temperatures. The manufacturer may obtain data regarding the rate at which the liquid dispenses under ideal conditions, and subsequently determine valve open times for requested amounts based on remaining amounts of liquid, as described above. In some embodiments, the manufacturer may use regression to determine a polynomial expression for the valve open time, or may store the valve open times in a table.

Then, the manufacturer may subject the dispenser 100 to various conditions that introduce error. For example, the manufacturer may bend the tube connected to the dispenser's 100 liquid reservoir. The manufacturer may load chilled or warmed liquid into the reservoir, or liquids of different viscosities (e.g., milk, cream, half-and-half). For each condition that introduces error, the manufacturer may again collect data regarding the rate at which the liquid dispenses, as described above, and use this data to derive valve open times.

For any given condition that introduces error, the manufacturer may compare the valve open times under ideal conditions with the valve open times under an error-related condition. For example, for a dispense of 10 mL when a liquid reservoir has 250 mL of liquid remaining, the manufacturer may determine the difference between the valve open times under ideal or error-related conditions, and this difference becomes a data point for a particular expected error factor function. In this manner, the manufacturer may obtain a set of data points by determining differences between valve open times for various pairs of requested amounts and remaining amounts of liquid, and associate the data points with the particular error-related condition. In some embodiments, the manufacturer may store the data points in memory, or use regression to fit the data points to a polynomial expression.

The manufacturer may repeat these steps for valve open times under different error-related conditions, thereby obtaining sets of data points corresponding to the errors under different conditions, which are used for the corresponding expected error factor function. In this manner, each error-related testing environment has an expected error factor function that may be expressed as e(R, W), where R is the requested amount and W is the amount of remaining liquid in the dispenser 100. Further, the set of expected error factor functions may be expressed as $$e_i(R,W)=\{e_1(R,W), e_2(R,W), e_3(R,W), \ldots, e_n(R,W)\}$$

where i is between 1 and n, and n corresponds to the final testing environment used by the manufacturer. Since each function e(R, W) corresponds to a 3D surface plot, the surface plots for the expected error factor functions may converge, diverge, or intersect at various values for R and W.

After the dispenser 100 is installed in a commercial setting, the dispenser 100 will likely be subject to multiple sources of error. As a result, the expected error factor may be derived from the functions 805, 810, 815 that correspond to the errors presented in the environment.

To identify which functions 805, 810, 815 to use, for the first dispense, the dispenser 100 determines the difference between the user-requested and measured amounts, $diff_1$. The dispenser 100 also evaluates each of the expected error factor functions $e_i(R, W)$ for the requested amount R and remaining liquid W. In this manner, the dispenser 100 obtains "n" errors, each corresponding to a different testing condition. The processor 130 compares the difference between the user-requested and measured amounts for the dispense, $diff_1$, with each calculated expected error $e_1(R_1, W_1)$, $e_2(R_1, W_1)$, $e_3(R_1, W_1)$, ..., $e_n(R_1, W_1)$.

The processor 130 selects the two values, among $e_1(R_1, W_1)$, $e_2(R_1, W_1)$, $e_3(R_1, W_1)$, ..., $e_n(R_1, W_1)$, that are closest to the $diff_1$. In some embodiments, one expected error is higher than $diff_1$, and the other is lower. In various embodiments, the processor 130 may select a predetermined number of evaluated values that are close to $diff_1$. In this manner, the dispenser 100 may determine the corresponding expected error factor functions that most closely match the operating conditions of the liquid dispenser 100. In some embodiments, the dispenser 100 may store indices corresponding to the selected functions.

For subsequent dispenses, the dispenser 100 may determine the expected error factor based on the functions identified as the ones to use for the dispenser 100, under its current environmental conditions. For example, suppose the dispenser 100 previously identified functions $e_4(R, W)$ and $e_9(R, W)$ as the applicable functions. Then, when the user requests a dispense of 10 mL for a reservoir 110 with 250 mL of liquid remaining, by way of example, the dispenser 100 may evaluate these functions to obtain $e_4$(10 mL, 250 mL) and $e_9$(10 mL, 250 mL). The dispenser 100 may derive the expected error factor from the results of these two evaluated functions.

In some embodiments, the dispenser 100 may average the evaluated results. Thus, continuing the example above, the expected error factor might be:

$$e=(e_4(10\ mL, 250\ mL)+e_9(10\ mL, 250\ mL))/2$$

In another embodiment, the dispenser 100 may calculate a weighted average of the $diff_1$ and the evaluated results. Thus, an exemplary formula for determining the expected error factor might be:

$$e=0.3*diff_1+0.35*e_4(10\ mL, 250\ mL)+0.35*e_9(10\ mL, 250\ mL)$$

However, any other function that accounts for the evaluated results of the expected error factor functions and the difference between the user-requested and measured amounts for a dispense may be used, as would be appreciated by one of ordinary skill in the art.

In various embodiments, the dispenser 100 may periodically reassess which expected error factor functions most closely match its operations. For example, the dispenser 100 may repeat the steps described herein every 15 dispenses. In another example, the dispenser 100 may repeat the steps if the differences between requested and measured amounts for dispenses do not decrease. For example, the dispenser 100 may compare the differences from the past five dispenses, and if the differences remain level or demonstrate a trend of increasing, the dispenser 100 may conclude that the expected error factor functions being used are incorrect. Thus, the dispenser 100 may select other expected error factor functions that may match the dispenser's 110 operations more closely.

Figure 9:
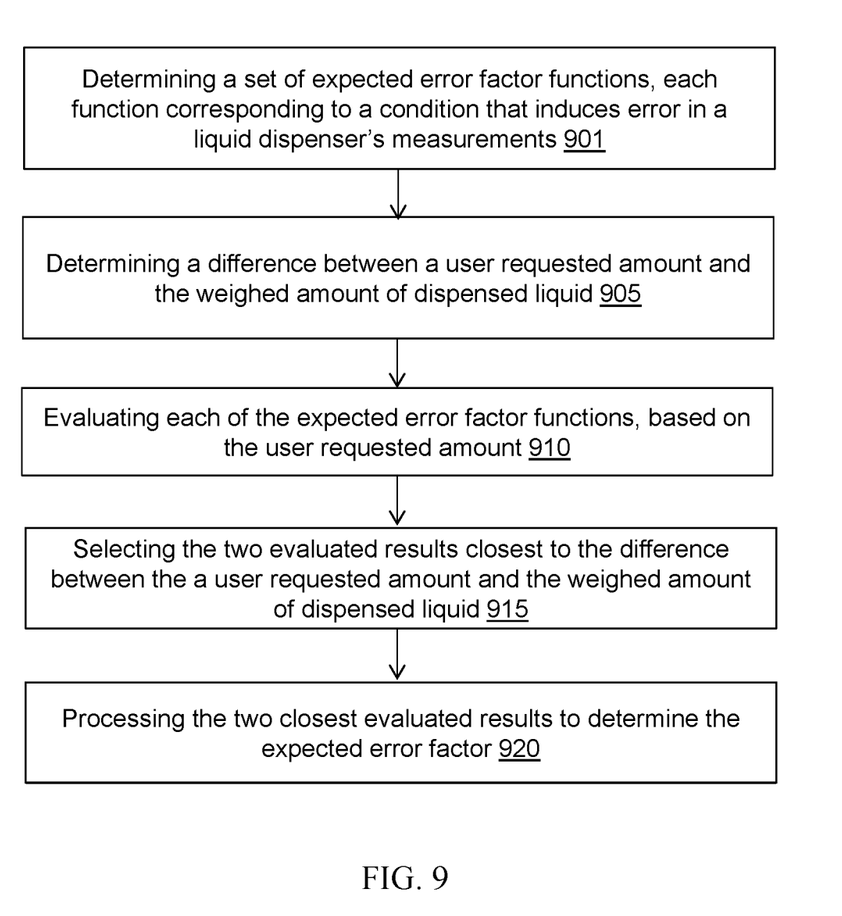
FIG. 9 depicts an exemplary flow diagram for a method of determining the expected error factor using the functions depicted in FIG. 8.

FIG. 9 depicts an exemplary flow diagram for this method of determining the expected error factor. In FIG. 9, the method includes determining a set of expected error factor functions, each function corresponding to a condition that induces error in a liquid dispenser's measurements (step 901). Dispensers in a laboratory setting, by way of example, may each be subjected to a different extrinsic factor, and data regarding their dispensing times may be collected. The data obtained under each extrinsic factor may be manipulated to create one of the expected error factor functions. When data for all extrinsic factors is thus manipulated, a set of expected error factor functions may be obtained. The functions may be programmed into the dispenser.

The method includes determining a difference between a user requested amount and the measured amount of dispensed liquid (step 905). The difference may be determined according to any of the steps described herein. The method also includes evaluating each of the expected error factor functions, based on the user requested amount (step 910). Thus, the method may obtain a set of expected error factors, each corresponding to a different extrinsic factor.

The method includes selecting the two evaluated results closest to the difference between the user requested amount and the measured amount of dispensed liquid (step 915). In some embodiments, the evaluated results immediately lower and higher than the measured amount may be selected. The method also includes processing the two closest evaluated results to determine the expected error factor (step 920). For example, the dispenser may average the evaluated results, or take a weighted average of the same.

Alternate Method of Determining the Valve Open Time

In some embodiments, instead of determining an adjustment for the preliminary valve open time, the processor 130 revises the polynomial expression for the valve open time. For example, the memory 135 may store the test data from the manufacturer that resulted in the coefficients A, B, C, D, E, F, G, and H for the polynomial expression (1). When the dispenser 100 dispenses an amount, the dispenser 100 may store the remaining amount of liquid in the reservoir 100 prior to the dispense, the measured amount of the dispense, and the valve open time, with the existing test data. Moreover, the dispenser 100 may delete from the test data the data that most closely corresponds to the newly acquired data. For example, the processor may remove the data point corresponding to the remaining amount of liquid and the valve open time, since the amount dispensed under testing conditions varies from the amount dispensed under actual, current conditions.

Based on this new data, the processor 130 may re-perform regression to determine updated coefficients A, B, C, D, E, F, G, and H for the polynomial expression (1). As the dispenser 100 continues to operate, the memory 135 stores more test data reflecting the dispenser's actual operation conditions. In this manner, the proportion of the amount of test data under current conditions, compared to data under ideal conditions, increases, and the updated coefficients reflect a more accurate representation of the dispenser's 100 functionality.

Other Elements of the Liquid Dispensers

In some embodiments, the user interface of the dispenser 110 may include a keypad through which the user inputs the desired volume or weight of liquid to dispense.

In addition to storing the errors, the memory 135 may store instructions for a computer program. The processor 130 may load and executes instructions from the memory 135 to implement the steps described herein. In some embodiments, the liquid dispenser 100 includes an additional memory for storing instructions for the computer program that is separate from the memory used for storing error data. Additionally, the dispenser 100 may include multiple memories for storing error data, computer program instructions, or both.

Furthermore, the load cell 115 may support either the entire weight of the reservoir 110, or a partial weight thereof. For example, the chamber 105 may include a platform, and the load cell 115 may be embedded in the platform or positioned beneath the platform to support it. When the reservoir 110 is placed on the platform, the load cell 115 supports the reservoir's 110 entire weight. Advantageously, when the load cell 115 supports the entire weight, disturbances to the reservoir 110 are less likely to impact the load cell's 115 measurements.

However, load cells 115 with larger capacities often exhibit lower resolution, compared to load cells 115 with smaller capacities. Thus, in some embodiments, the load cell 115 may be configured to support a partial weight of the reservoir 110. For example, the reservoir 110 may be positioned such that the load cell 115 supports one end of the reservoir 110. The chamber may have additional framework that supports the other end of the reservoir 110. In this manner, only a portion of the reservoir 110 exerts its weight against the load cell 115.

In some embodiments, the dispenser 100 includes a plurality of load cells. Each load cell supports a partial weight of the reservoir 110, and the load cells collectively support the entire weight of the reservoir 110 such that the processor 130 may determine the entire weight based on the signals received from the load cells. For example, the processor 130 may add the signals from the load cell together and derive the entire weight of the reservoir 110 from this sum. In this manner, the embodiments may measure the entire weight of the reservoir 110 directly, while retaining the superior accuracy that higher resolution, smaller capacity load cells afford.

In some embodiments, the load cell 115 includes a bridge of four strain gauges. When the load cell 115 supports the reservoir 110, the weight of the reservoir 110 applies a force to the top surface of the cell 115, causing a deflection of the load cell body that is measured by the bridge of four strain gauges. The load cell 115 may be electrically connected to the processor 130 and continuously send signals regarding the deflection exerted by the reservoir 110. Based on these signals, the processor 130 may derive the amount of remaining liquid in the reservoir 110.

In various embodiments, the reservoir 110 may be a rigid container, such as a tank. The tank may be made of plastic or metal. In other embodiments, the reservoir 110 may be a plastic bag, and the plastic bag may be inserted into a rigid case that is configured to be inserted into the chamber 105. The reservoir 110 may include a tube outlet exiting from its bottom, and the tube outlet may be configured so that the user may attach a flexible tube to the outlet prior to installing the reservoir 110 in the dispenser 100. When the tube 120 is fitted on the outlet, the tube 120 extends from the reservoir 110 through a valve 125 to a dispensing area exterior to the chamber 105. In some embodiments, the tube 120 may be supplied as an integral part of the reservoir 110. In some embodiments, the tube 120 is flexible and the valve 125 is a pinch valve that, at rest, squeezes the tube 120 shut. In various embodiments, the pinch valve 125 may be activated by a solenoid, a stepper motor, or an offset cam.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A liquid dispenser, comprising:
   a liquid reservoir having an amount of liquid remaining therein;
   a measurement device providing at least one signal indicative of the amount of liquid remaining in the liquid reservoir;
   an electrically actuated valve coupled to a tube outlet exiting from a bottom of the liquid reservoir; and
   a processor that is (1) electrically connected to the measurement device and (2) operatively coupled to and controlling operation of the valve,
   wherein the processor is configured to determine a valve open time for dispensing a requested amount of liquid, the valve open time depending upon (1) a preliminary time based on the requested amount and the at least one signal from the measurement device, and (2) an adjustment to the preliminary time based on a difference between a requested amount and a measured amount determined by signals from the measurement device for at least one previous dispense.

2. The liquid dispenser of claim 1, wherein the processor determines the preliminary time by evaluating a polynomial expression, the polynomial expression including coefficients that operate on the requested amount of liquid and the output from the measurement device.

3. The liquid dispenser of claim 2, wherein the processor determines the adjustment using at least an expected error factor.

4. The liquid dispenser of claim 3, wherein the processor determines the expected error factor by adding, from at least two previous dispenses, differences between requested amounts and measured amounts.

5. The liquid dispenser of claim 3, wherein the processor determines the expected error factor by evaluating an expected error factor function, based on the requested amount.

6. The liquid dispenser of claim 5, wherein the processor further
   determines an offset by comparing (1) the expected error factor against (2) the difference between the requested amount and the measured amount for the dispense; and
   adjusts the expected error factor function by the offset.

7. The liquid dispenser of claim 3, wherein the processor determines the expected error factor by evaluating a plurality of expected error factor functions using (1) the requested amount and (2) the output from the measurement device;

identifying two expected error factor functions whose evaluated results are closest to the difference between the requested amount and the measured amount for the dispense; and averaging the two expected error factors.

8. The liquid dispenser of claim 3, wherein the processor determines the expected error factor by calculating a weighted average of differences between requested amounts and measured amounts, from at least two previous dispenses.

9. The liquid dispenser of claim 1, wherein the preliminary time is based on an entry in a look-up table, the entry being indexed according to the requested amount of liquid and the output from the measurement device.

10. A liquid dispenser, comprising:
a liquid reservoir;
a measurement device providing an output indicative of an amount of liquid remaining in the liquid reservoir;
an electrically actuated valve coupled to a tube outlet that is positioned near a bottom of the liquid reservoir;
a memory configured to store data regarding (1) requested amounts of liquid, (2) remaining amounts of liquid in the reservoir, and (3) valve open times for dispensing the requested amounts of liquid in light of the remaining amounts of liquid in the reservoir; and
a processor that is electrically connected to the measurement device and operatively coupled to and controlling operation of the valve, wherein the processor (1) determines a valve open time by evaluating a polynomial expression, the polynomial expression including coefficients that operate on a user-requested amount of liquid to be dispensed and the output from the measurement device, (2) determines a measured amount of liquid dispensed based on outputs of the measurement device before the dispense and after the dispense, (3) replaces data in the memory with the valve open time, output from the measurement device, and measured amount of liquid dispensed, and (4) re-determines the coefficients for the polynomial expression.

11. A method for dispensing a requested amount of liquid from a liquid dispenser based on at least one previous dispense, the method comprising:
receiving, by a processor, a request to dispense an amount of liquid;
receiving, by the processor from a measurement device, at least one signal indicative of an amount of liquid remaining in a liquid reservoir;
determining, by the processor, a valve open time depending upon (1) a preliminary time based on the requested amount and the at least one signal from the measurement device, and (2) an adjustment to the preliminary time based on a difference between a previously requested amount and a measured amount determined by signals from the measurement device for at least one previous dispense; and
actuating, by the processor, a valve to remain open for a duration of the valve open time to enable liquid to flow through a tube outlet exiting from the liquid reservoir.

12. The method of claim 11, further comprising:
determining, by the processor, a measured amount for the dispense based on signals from the measurement device; and
storing a difference between the requested amount and the measured amount for the dispense.

13. The method of claim 11, wherein determining the valve open time comprises:
evaluating a polynomial expression to determine the preliminary time, the polynomial expression including coefficients that operate on the requested amount of liquid and the at least one signal from the measurement device.

14. The method of claim 13, wherein determining the valve open time comprises:
using at least an expected error factor to determine the adjustment to the preliminary time.

15. The method of claim 14, wherein determining the valve open time comprises:
adding, from at least two previous dispenses, differences between requested amounts and measured amounts to determine the expected error factor.

16. The method of claim 14, wherein determining the valve open time comprises:
evaluating an expected error factor function, based on the requested amount, to determine the expected error factor.

17. The method of claim 16, further comprising:
comparing (1) the expected error factor against (2) a difference between the requested amount and the measured amount for the dispense, to determine an offset; and
adjusting the expected error factor function by the offset.

18. The method of claim 14, wherein determining the valve open time comprises:
evaluating a plurality of expected error factor functions using (1) the requested amount and (2) the at least one signal from the measurement device;
identifying two expected error factor functions whose evaluated results are closest to a difference between the requested amount and the measured amount for the dispense; and
averaging the two expected error factors.

19. The method of claim 14, determining the valve open time comprises:
calculating a weighted average of differences between requested amounts and measured amounts, from at least two previous dispenses, to determine the expected error factor.

20. The method of claim 11, wherein determining the valve open time comprises:
retrieving the preliminary time from an entry in a look-up table, the entry being indexed according to the requested amount of liquid and the at least one signal from the measurement device.

21. The method of claim 11, wherein receiving the at least one signal indicative of an amount of liquid remaining in a liquid reservoir comprises:
receiving the at least one signal from a load cell.

* * * * *